United States Patent
Swift

(10) Patent No.: US 9,868,863 B1
(45) Date of Patent: Jan. 16, 2018

(54) COMPOSITIONS HAVING SLIP RESISTANCE AND LUMINOUS PROPERTIES

(71) Applicant: Swift Maintenance Products, Inc., Weston, FL (US)

(72) Inventor: Philip Swift, Weston, FL (US)

(73) Assignee: Swift IP, LLC, Weston, FL (US)

( * ) Notice: Subject to any disclaimer, the term of this patent is extended or adjusted under 35 U.S.C. 154(b) by 569 days.

(21) Appl. No.: 14/176,090

(22) Filed: Feb. 8, 2014

Related U.S. Application Data

(60) Provisional application No. 61/762,635, filed on Feb. 8, 2013.

(51) Int. Cl.
*C09D 5/22* (2006.01)

(52) U.S. Cl.
CPC ......... *C09D 5/22* (2013.01); *Y10T 428/24802* (2015.01)

(58) Field of Classification Search
CPC .................................. C09D 5/004; C09D 5/22
See application file for complete search history.

(56) References Cited

U.S. PATENT DOCUMENTS

| | | | | | |
|---|---|---|---|---|---|
| 2,867,591 | A | * | 1/1959 | Lederman | C08G 59/1472 523/456 |
| 4,544,677 | A | * | 10/1985 | Allen | C08J 9/0061 521/134 |
| 4,745,139 | A | * | 5/1988 | Haasl | C09D 153/00 106/36 |
| 5,167,705 | A | * | 12/1992 | Coughlan | C09D 5/00 106/36 |
| 5,874,491 | A | * | 2/1999 | Anders | C09D 5/004 252/301.36 |
| 6,005,024 | A | * | 12/1999 | Anders | C09D 5/004 252/301.36 |
| 7,994,224 | B2 | * | 8/2011 | Wyers | C09D 5/021 424/405 |
| 2008/0185557 | A1 | * | 8/2008 | Agrawal | B05D 5/06 252/301.35 |

FOREIGN PATENT DOCUMENTS

JP   61040382 A * 2/1986
WO   WO 2011053568 A1 * 5/2011 ............... B32B 3/30

* cited by examiner

*Primary Examiner* — Gerard Higgins
(74) *Attorney, Agent, or Firm* — Banner & Witcoff, Ltd.

(57) ABSTRACT

Anti-slip coating compositions having improved optical properties, such that they can emit visible light in a dark or dimly lit environment, or otherwise in the presence of ultraviolet (UV) light, are disclosed. Coatings obtained from these compositions, as well as coated substrates treated with these coatings, are also described.

18 Claims, No Drawings

COMPOSITIONS HAVING SLIP RESISTANCE AND LUMINOUS PROPERTIES

CROSS-REFERENCE TO RELATED APPLICATIONS

This application claims priority to U.S. Provisional Patent Application No. 61/762,635, filed Feb. 8, 2013, which is hereby incorporated by reference in its entirety.

FIELD OF THE INVENTION

The present invention relates to liquid dispersions comprising both a phosphorescent or fluorescent pigment, and a dispersed, solid particulate traction enhancer. The invention also relates to coatings formed from such compositions, which can impart both anti-slip and improved optical properties to a substrate.

BACKGROUND

The loss of foot traction with the floor or an outdoor ground surface such as a pool deck can result in a loss of balance (slip) and ultimately a fall. This may have consequences ranging from minor pain to broken bones or even more serious conditions. Other types of problems, whether or not associated with an injury, can result from the loss of hand traction with a hand rail, a hand tool, sporting equipment, or other surface that is intended to be gripped by a user. The causes of accidents relating to a detrimental loss of traction, or a failure to establish sufficient traction in the first place, can be grouped into two primary categories: the existence of a substance (e.g., water or oil) that renders a surface slippery, or the inability of a person to see the surface altogether. Certain segments of the population, such as the elderly, are more prone to sustaining injury resulting from the existence of either or both of these conditions in their environment.

Although a number of commercial products are designed to enhance traction, there remains a need in the art for surface coatings that also enhance awareness of the coating's location under conditions of compromised illumination, for example during a power outage that may be associated with a storm or other emergency situation. In this manner, such coatings could simultaneously address both root causes of loss of foot and/or hand traction over a broad range of activities and circumstances.

SUMMARY OF THE INVENTION

The present invention is associated with the discovery of anti-slip coating compositions having improved optical properties, such that they can emit visible light in a dark or dimly lit environment, or otherwise in the presence of ultraviolet (UV) light. Embodiments of the invention more specifically relate to such compositions comprising (i) a base material, such as an oil- or solvent-based paint, (ii) a dispersed, solid particulate fraction enhancer, and (iii) a phosphorescent or fluorescent pigment. A number of considerations arise in the formulation of such dual-functional compositions, for example the need to attain sufficient traction enhancement and luminosity for a reasonable application of the coating, such as not more than two or three passes (coats). In addition, for such an application, neither the traction enhancer nor the pigment should be used in an amount in substantial excess of the point of diminishing utility, for example in an amount at which additional traction enhancer will have little impact on increasing the coefficient of friction of a surface. This can lead to the waste of the valuable components of the composition, as well as increased cost to the consumer. Therefore, for example, a composition should ideally be formulated such that good luminosity under dark conditions is achieved, together with acceptable utilization of the traction enhancer. Likewise, good frictional characteristics should be achieved with acceptable utilization of pigment. Furthermore, the amounts of traction enhancer and pigment should ideally not be such that they have the effect of interfering with each other. For example, certain quantities of solid particles, such as those used to provide good traction characteristics, can cause a matte appearance that detracts from the ability of a phosphorescent or fluorescent pigment to render a surface more visible.

Additional considerations arise in the formulation of a spray coating, in which the base material becomes aerosolized into fine droplets before it is deposited on a surface of the target substrate. For sprayable compositions, the total and individual quantities of the traction enhancer and pigment, as well as their average particle sizes, must be such that problems associated with nozzle clogging, solids agglomeration, and uneven solids distribution in the applied coating are avoided. Representative sprayable compositions according to embodiments of the invention comprise a propellant, a solvent, and an acrylic resin or an epoxy resin, in addition to the traction enhancer and pigment as described herein. A phosphorescent pigment is preferably present in the sprayable composition in an amount from about 10% to about 40% by weight, based on its dry solids (e.g., dry powder) weight.

Further embodiments of the invention relate to substrates that are treated to promote safety. At least a portion of an outer surface of the substrate has deposited thereon a dried coating of a base material as described herein (e.g., an acrylic resin), where the coating further comprises a phosphorescent or fluorescent pigment and a solid particulate traction enhancer.

Yet further embodiments relate to methods for making a composition as described herein, comprising combining (i) a base material, such as an oil- or solvent-based paint, (ii) a solid particulate traction enhancer, and (iii) a phosphorescent or fluorescent pigment, preferably in the amounts and/or ratios as described herein, to provide the composition as a liquid dispersion, i.e., having the fine solid particulates of both the traction enhancer and the pigment distributed essentially uniformly throughout the composition. In the case of making a sprayable composition, a propellant and a solvent are combined with (i), (ii), and (iii) above in a pressurized vessel (e.g., a spray can). The vessel can include appropriate internals to aid in the mixing of the components if necessary (e.g., in the case of a two-part epoxy), as well as in the dispensing of these components in the form of fine, aerosolized droplets. Still further embodiments relate to methods for enhancing the traction and optical properties of a substrate, comprising applying the composition to at least a portion of a surface of the substrate. More specific embodiments relate to such methods, whereby the safety associated with the use of the substrate is improved.

These and other embodiments and aspects relating to the present invention are apparent from the following Detailed Description.

DETAILED DESCRIPTION

Representative compositions described herein and having both anti-slip characteristics as well as improved optical properties, comprise a base material that is normally an aqueous or non-aqueous liquid or otherwise an emulsion, such as in the case of an acrylic resin. The base material forms a coating by evaporation of an inorganic (e.g., water) or organic (e.g., thinner) component, leaving behind resin solids (e.g., coalesced acrylic polymers) or oils that form a dried coating. Other base materials may be liquids, such as two-part epoxy resins, that polymerize and cross-link to form hard coatings. Exemplary base materials include liquids used in paint formulations, such as those in the form of an acrylic resin, an alkyd resin, a latex, an oil (containing a volatile organic component such as mineral spirits that evaporates upon application), and an enamel. Preferred base materials are epoxy resins and acrylic resins, which can provide coatings that allow for the passage of visible light to and from the underlying substrate (i.e., are translucent) and in some cases are completely clear (i.e., are transparent). Translucent coatings, for example in the case of some epoxy resins, include those in which some haze may be present, which hinders but does not completely obstruct the passage of light.

Any of a number of possible solid particulate traction enhancers may be dispersed in the liquid base material, in order to achieve an increased coefficient of friction in the resulting coating after the composition dries and hardens. Exemplary particulate materials are those which can provide, in the dried coating, a gritty surface texture to improve traction (e.g., with the contacting hand, foot, glove, or shoe), while remaining essentially inert to the components used in the composition and ultimately in the coating. Representative particulate materials are refractory minerals such as metal oxides (e.g., silica and alumina), which specifically include alkali and alkaline earth metal oxides and mixed metal oxides. Additional types of minerals are metal carbonates and metal silicates, and particularly the carbonates and silicates of any of the alkali and alkaline earth metals (e.g., calcium carbonate). Metal particles, including metal alloys, may also be used, as well as natural clay minerals (e.g., kaolinite) and organic substances (e.g., walnut shells). Polymer beads can also be used as the solid particulate traction enhancer, with polyolefins (e.g., polyethylene or polypropylene), polystyrene, polyvinyl chloride, polyurethane, acrylonitrile butadiene styrene, thermoplastic rubbers, ethylene vinyl acetate, and polyesters being representative. Any of the above minerals, metals, organic substances, and polymers may be formed into particles of a desired size or size range, for example by grinding and screening. The ability of the solid particulate traction enhancer to form a suitable dispersion in the base material, without substantial settling, will depend on the relative densities of the particulate and the components of the composition, as well as the degree to which they interact chemically. Preferred solid particulate traction enhancers include minerals such as silica and calcium carbonate, due to their stability in the compositions, as well as their high availability and low cost.

Phosphorescent pigments are characterized by their ability to absorb light energy under illuminated conditions and then re-emit the absorbed radiation for up to several hours thereafter. The property of phosphorescence, which results in a desired glow-in-the-dark effect, is achieved with materials, such as metal ion-doped aluminates and sulfides, exhibiting the delayed re-emission of visible light. This delay is due to the "entrapment" of light energy, in energy states at which photon emission can occur only through classically "forbidden" electron transitions in the pigment. A representative pigment is zinc sulfide, which may be doped or activated with silver ions or copper ions, although doping with ions of any element of Groups 8-12 of the Periodic Table is possible. Preferred pigments include alkaline earth metal aluminates (e.g., strontium aluminate), doped with rare earth ions such as europium. Such pigments exhibit high luminosity, generally emitting visible light in a wavelength range of 450-550 nanometers (nm), characteristic of blue to green light, for a period of several hours in a darkened environment. A powder of $SrAlO_3$:Eu is representative. Additional phosphorescent pigments include other types of phosphors, such as gallates having the formula $M_3Ga_{5-x}A_xDO_{(m+(3y/2)+(tz/2))}$:$(yCr^{3+},zT'^{+})$, as described in patent application publication 2012/0119143, the disclosure of this genus of phosphors being hereby incorporated by reference.

According to other embodiments, a fluorescent pigment may also be incorporated into the composition in place of, or in addition to, a phosphorescent pigment. Fluorescent pigments have the capability of modifying incident UV energy (i.e., "black light" energy) and reflecting it with lower energy/longer wavelength radiation within the visible spectrum. "Invisible" fluorescent pigments may be used in the compositions, such that the coatings produced from them will appear translucent (e.g., pale/hazy or in some cases completely transparent) under daytime lighting, but will glow in the presence of UV light. A number of organic and inorganic fluorescent pigments, including invisible fluorescent pigments, are commercially available, for example, from Angstrom Technologies, Inc., Florence, Ky., USA. It is also understood that fluorescent dyes may be used in place of fluorescent pigments, with representative dyes being rhodamines, fluoresceins, coumarins, naphthalimides, benzoxanthenes and acridines. Typical dyes within these families include Basic Red 1, Basic Violet 10, Basic Violet 11, Basic Violet 16, Basic Yellow 40, Solvent Yellow 44, Solvent Yellow 131 and Solvent Yellow 135. Such dyes may, if desired, be incorporated into a resin (e.g., a polystyrene, polyvinyl chloride, polyurethane, or a polyester) during its formation. Thereafter, the resin can be ground to the proper particle size and incorporated into the composition, for example in the amounts by weight as described herein with respect to pigments.

Sprayable compositions can be obtained using any of the base materials described herein, through the use of a propellant to aerosolize the composition. Preferred base materials for sprayable compositions are epoxy resins and acrylic resins. Propellants that can effectively atomize the base material, such that it is dispensed as a fine mist to allow for its even application to a substrate surface, include hydrocarbons having high vapor pressures such as propane, butane, and mixtures thereof. Other propellants include halogenated hydrocarbons such as hydrofluorocarbons (HFCs), including 1,1-difluoroethane and tetrafluoromethane. Sprayable compositions can also contain organic solvents, which evaporate following application, thereby leaving a dry coating after some period of drying. Representative solvents include aromatic hydrocarbons such as toluene and xylenes, as well as ketones such as acetone and methyl ethyl ketone. A representative sprayable composition therefore comprises, in addition to a base coating material comprising an epoxy resin or an acrylic resin, at least one propellant and at least one solvent. According to particular embodiments, the propellant comprises a hydrocarbon or mixture of alkane hydrocarbons (e.g., a mixture of propane and butane) and the solvent comprises an aromatic hydrocarbon or mixture of aromatic hydrocarbons (e.g., a mixture of toluene and xylenes).

In the case of a sprayable composition, the amount of phosphorescent or fluorescent pigment is limited to the amount that can be sprayed without clogging of the spray nozzle and without substantially interfering with the uniformity of the applied coating. In addition, the upper limit of the pigment, which can be incorporated as a practical matter into the sprayable composition, must be weighed against the nominal amount needed to provide the desired visibility in dark, dimly lit, or UV lit environments. Good visibility, associated with the intensity of visible light emission, must be achieved with a modest application of the composition as needed for thorough coating of the substrate. Users generally perceive adequate surface coverage as requiring 2-3 "swipes" or passes with the spray can, which corresponds to a given coating thickness as well as a given coverage ratio (e.g., in weight per unit area) of both the solid particulate traction enhancer and the phosphorescent or fluorescent pigment.

Through experimentation with sprayable compositions with typical amounts of volatile components (which are not present in the final coating), it has been determined that the phosphorescent or fluorescent pigment is present in such a sprayable composition in an amount of less than about 50% by weight and more preferably in an amount of less than about 40% by weight, based on the dry solids weight. The dried solids weight can be found by heating a sample of the pigment or other solid powder to an elevated temperature (e.g., 110° C.-150° C.) and for a period of time (e.g., 2 hours) under an inert gas purge or vacuum, such that water and other volatile components are driven from the sample. A preferred amount of pigment in the compositions described herein, which yields good sprayability characteristics, as well as good visibility when applied in an amount for effective coating applications, is in the range from about 10% to about 40%, and even more preferably from about 15% to about 25% by weight, based on the dry solids weight.

These considerations, associated with the coverage ratio of the pigment and the resulting visibility of the dried coating, must also be taken in conjunction with the desired performance of the traction enhancer, as well as the total solids (both pigment and traction enhancer) that may be incorporated into a sprayable composition. Preferably, this total solids level does not exceed about 60%, based on the total dry solids weight, and more preferably does not exceed about 50%, or even 45%. According to specific embodiments, the phosphorescent or fluorescent pigment and the traction enhancer are present in a combined amount from about 20% to about 55%, and more preferably from about 30% to about 50%, by weight. In addition, it has been determined that good, combined traction enhancement and visibility characteristics are obtained at a weight ratio of the traction enhancer to the pigment from about 2:1 to about 1:10, preferably from about 1:1 to about 1:5, and more preferably from about 1:1 to about 1:3. In addition, for ease of formulation of a sprayable composition, the average particle size of both the solid particulate traction enhancer and the pigment is generally less than about 5 microns ($\mu$m), preferably from about 0.5 $\mu$m to about 5 $\mu$m, and more preferably from about 1 $\mu$m to about 3 $\mu$m.

The above amounts, ratios, and particle sizes of the pigment and traction enhancer components are also generally applicable to compositions that are not sprayable, such as those intended to be brushed or rolled onto a substrate, or used to coat the substrate in some other manner (e.g., by dipping). However, non-sprayable formulations can, in general, have broader ranges compared to those given above. For example, the phosphorescent or fluorescent pigment may be present in a non-sprayable formulation in an amount generally ranging from about 5% to about 50% by weight, based on dry solids.

The compositions described herein are useful for treating substrates to improve safety, in terms of increased friction or traction, as well as increased visibility, associated with their use. The substrates may be treated by spraying them with a sprayable composition as described above, containing suitable propellants and solvents. Alternatively, the substrates may be treated by painting them with the composition (e.g., by brushing or rolling), by temporarily dipping or suspending the substrate in a reservoir of the composition and removing an excess amount of the composition, or by applying the composition in any other manner, with the objective of coating at least a portion of the substrate surface. Treatment of the substrate, followed by drying, for example under ambient or optionally heated conditions, and/or optionally in the presence of a circulating gas stream (e.g., air or an inert gas such as pure nitrogen), will result in the substrate having deposited thereon a dried coating. This coating may be formed of any of the base materials (e.g., an acrylic resin or an epoxy resin) described above, following removal of water and/or other volatile components or otherwise following a chemical reaction (polymerization). Advantageously, the coating will further include the phosphorescent or fluorescent pigment, described above, and the solid particulate traction enhancer.

Representative dried coating thicknesses are from about 10 $\mu$m to about 100 $\mu$m, although the thickness can be increased or decreased beyond this range, depending on the particular application and the manner in which the coating is applied. In general, however, coating thicknesses within this range provide desirable levels of both anti-slip and glow-in-the-dark properties, without excess utilization of the traction enhancer and pigment (i.e., utilization that is substantially beyond the point of diminishing utility of these components). For many applications, under normal conditions of being relatively brightly illuminated by natural sunlight or artificial light, the coating is preferably invisible (transparent) or substantially invisible (translucent, and having a slight haze or cloudiness), such that the substrate surface can be seen beneath the coating. Even when the coating is invisible or substantially invisible in such a lighted environment, it nevertheless performs the function of increasing the traction or coefficient of friction of the substrate, relative to that of the substrate in the absence of the coating. Following energy absorption in a lighted environment, the composition in preferred embodiments emits visible light in a dark or relatively dimly illuminated environment. Therefore, in most instances when sufficient lighting is available, visibility of the coating is often not necessary or even desired. However, in situations when lighting is absent (e.g., during a power outage), visibility of the coating may become critically important, for example, to illuminate a walkway or stairs of an emergency exit.

According to other embodiments, the pigment may impart a visible color on the surface of the substrate where it is applied. In such embodiments, the pigment exhibits phosphorescence or fluorescence in a dark or relatively dimly illuminated environment, but also emits color in relatively brightly illuminated environment.

Representative surfaces, or at least portions of surfaces, upon which compositions described herein may be deposited (e.g., by spraying, brushing, rolling, dipping, etc.), include any indoor floor or outdoor ground surface, or any handle surface. Such surfaces therefore embrace any of those intended to be traversed (e.g., by walking or running) or gripped. Exemplary substrates therefore have such a surface as an outer surface, and these substrates include steps (e.g., single step or a plurality of steps, such as in a flight of stairs), a walkway, an aisle, a handrail, a door handle or doorknob, or a grip (e.g., on a tool such as a hammer or on sports equipment such as a baseball bat). Other specific examples of substrates include those which must be traversed or gripped in an emergency situation, such as the walkways, stairwells, and door handles used for exiting a building (e.g., a theatre) in the case of a fire, power loss, or other emergent situation. Stairs, steps, and aisles leading passengers out of boats, aircraft, buses, and other vehicles are also representative substrates. Further exemplary substrates include those that regularly have contact with moisture and are therefore prone to being slippery. The floors of showers, tubs, and saunas, as well as pool decks, are particular examples of such substrates.

As mentioned, it is not necessary that the entire outer surface of a substrate be coated. In general, it is only necessary to coat that portion of the substrate where the user makes contact, generally with the hand or foot. To further emphasize the location of the coating in a darkened environment, the coating may be applied in the form of one or more words or indicia, for example through a stencil. Such indicia can provide important instructions, such as in the case of a combination of the words "STEP HERE" with the outline of footprints where the user is instructed to step. Other indicia may include arrows directing the users to a building exit. In many cases it is not desired that such words or indicia, or the coating itself, be visible under normal, illuminated conditions. Therefore, according to preferred embodiments of the invention, the underlying substrate is visible through the coating in an illuminated environment, such that the coating cannot be visibly perceived, although its benefit in terms of increased traction is still obtained. In a dark environment, both of the advantages of increased traction and increased visibility (through the emission of visible light) are realized simultaneously.

Overall, aspects of the invention are directed to compositions and coatings that result from their application (e.g., by spraying), whereby the benefit of enhanced traction of a substrate provides safety benefits on an ongoing basis, whereas the added benefit of increased visibility is obtained "on demand," i.e., as needed, and without any need for monitoring or the use of external power. Those having skill in the art, with the knowledge gained from the present disclosure, will recognize that various changes could be made in these compositions, coatings, and substrates without departing from the scope of the present invention.

The invention claimed is:

1. An anti-slip composition having optical properties, the composition comprising (i) a base material, (ii) a dispersed, solid particulate traction enhancer, and (iii) a phosphorescent or fluorescent pigment,
   wherein the solid particulate traction enhancer has an average particle size of less than about 5 microns, and
   wherein the phosphorescent or fluorescent pigment and the solid particulate traction enhancer are present in the composition in a combined amount from about 20% to about 55% by weight.

2. The composition of claim 1, wherein the base material is selected from the group consisting of an epoxy resin, an acrylic resin, an alkyd resin, a latex, an oil, and an enamel.

3. The composition of claim 2, wherein the base material comprises an epoxy resin or an acrylic resin, and wherein the composition further comprises at least one propellant and at least one solvent.

4. The composition of claim 1, wherein the phosphorescent or fluorescent pigment is present in the composition in an amount from about 5% to about 50% by weight, based on dry solids.

5. The composition of claim 4, wherein the phosphorescent or fluorescent pigment is present in the composition in an amount from about 10% to about 40% by weight, based on dry solids.

6. The composition of claim 1, comprising a phosphorescent pigment that is an alkaline earth aluminate, doped with rare earth metal ions, or zinc sulfide, doped with silver ions or copper ions.

7. The composition of claim 1, wherein the solid particulate traction enhancer comprises a metal, a metal alloy, a metal oxide, a metal carbonate, a metal silicate, a clay mineral, an organic substance, or a polymer.

8. The composition of claim 1, wherein the composition is translucent in a lighted environment.

9. The composition of claim 8, wherein the composition is transparent in a lighted environment.

10. The composition of claim 1, wherein the composition is phosphorescent in a dark environment, following energy absorption in a lighted environment.

11. The composition of claim 1, having a weight ratio of the solid particulate traction enhancer to the phosphorescent or fluorescent pigment from about 2:1 to about 1:10.

12. A sprayable composition comprising a propellant, a solvent, an acrylic resin, a solid particulate traction enhancer, and a phosphorescent pigment that is present in the composition in an amount from about 10% to about 40% by weight,
   wherein the solid particulate traction enhancer has an average particle size of less than about 5 microns, and
   wherein the phosphorescent or fluorescent pigment and the solid particulate traction enhancer are present in the composition in a combined amount from about 20% to about 55% by weight.

13. The sprayable composition of claim 12, wherein the propellant comprises an alkane hydrocarbon or mixture of alkane hydrocarbons, and the solvent comprises an aromatic hydrocarbon or mixture of aromatic hydrocarbons.

14. A treated substrate that has been treated to impart safety during its use, wherein at least a portion of an outer surface of the substrate has deposited thereon a dried coating of an epoxy resin, an acrylic resin, an alkyd resin, a latex, an oil, or an enamel base material, the coating further comprising a phosphorescent or fluorescent pigment and solid particulate traction enhancer, and
   wherein the coating has a thickness from about 10 µm to about 100 µm and is formed by drying the anti-slip composition of claim 1.

15. The treated substrate of claim 14, wherein the substrate is a floor or a ground surface, or a handle.

16. The treated substrate of claim 15, wherein the substrate is a step, a walkway, an aisle, a shower or tub floor, a pool deck, a handrail, a door handle, or a grip.

17. The treated substrate of claim 14, wherein the coating is applied in the form of one or more words or indicia.

18. The treated substrate of claim 14, wherein the substrate is visible through the coating in an illuminated environment and wherein the coating emits visible light in a dark environment.

* * * * *